Patented Feb. 13, 1951

2,541,731

UNITED STATES PATENT OFFICE

2,541,731

PROCESS OF MAKING CANNED GELATIN

Crawford J. Walker, Indianapolis, Ind.

No Drawing. Application February 5, 1949,
Serial No. 74,865

1 Claim. (Cl. 99—130)

This application relates to a process for producing canned gelatin in various flavors to have the gelatin in that state whereby it is ready for immediate use or consumption upon opening of the can. In so far as I know, all gelatin heretofore has been sold in the granulated or powdered form so that the housewife would have to use hot water or warm water after initially dissolving the gelatin to complete the forming of the liquid solution, and then wait for the solution to coagulate or to jell before the product could be ready for serving.

My invention presents quite a few advantages, namely that the user of the product will find the product immediately available for serving by opening the can and withdrawing the gelatinized product; the product is formed to remain in a superior condition, in that it will become neither "rubbery" nor will it tend to disintegrate into a water-like fluid; and in a very pronounced way, the initial flavoring will remain intact without any possibility of volatilizing such as has been the case where the gelatin has been prepared previously and sold in packages in the dry or powdered or granulated state.

These and many other objects and advantages of the invention will become apparent in the following description of the method.

The product is formed in metal cans of varying sizes, so that the purchaser may select the size desired for the number of servings required. Taking as a typical example of the process, as applied to a number two can, I place directly in the can one inch depth of cold water. The exact temperature of this water is immaterial, but it should be below room temperature and preferably around fifty to fifty-five degrees F.

Then into the can containing this cold water, there is placed three-eighths of an ounce of dry gelatin. The mixture of the gelatin and cold water is allowed to stand for from two to three minutes.

To the gelatin-water mixture, I add a mixture consisting of one dram of flavoring extract, including the desired coloring matter; four grains of salt, that is sodium chloride; fifty grains of either tartaric or citric acid, depending upon the flavor used in this mixture; and three and one-half ounces of cane sugar.

The fourth step consists of filling the can with the above indicated ingredients therein until the can is completely full with water at two hundred and twelve degrees F. or above. The temperature of the water must be at the boiling point or above.

The fifth step consists of immediately sealing the can following the addition of the hot water.

The sixth step consists of placing the sealed can in a water bath and holding it there for ten minutes, maintaining the temperature of the water bath at a minimum of two hundred and twelve degrees F.

Then the seventh and final step consists in taking the sealed can from the water bath at the end of the period defined for that bath, and quickly cooling the can and holding it in the cooling medium, such as cold running water for at least ten minutes. It is necessary that the contents become quickly cooled down to at least room temperature, and preferably therebelow, and before being ready for consumption, the cooled, sealed can is held long enough to permit the jelling action to proceed to completion. Placing the sealed can in a medium at freezing temperature of water for four hours is preferred.

The process thus defined produces a gelatin which does not have any solids or residue left in the bottom of the can, nor is there any water residue in the can. Neither will there be a separation of water from the product after it is removed from the can. The product thus prepared may be kept for long periods of time in the can-sealed state and retain its superior qualities. The full strength and aroma of the flavoring is maintained so that the product when removed from the can has a very decided "fresh" odor as well as taste. Furthermore it is to be noted, that in the foregoing described procedure, at no time is it necessary to stir the ingredients before the can is sealed. A peculiarity of the product is that the unopened, sealed can may be heated to liquefy the contents, the contents removed, fruit added as desired, and then upon re-chilling the product jells again.

In regard to the sequence of steps above set forth, that sequence is important and is to be followed with the single exception that the initial two steps, namely placing cold water in the can and then adding gelatin, may be reversed, and the appended claim is to be interpreted accordingly.

I claim:

The process of making a canned gelatin product which comprises, in using ingredients in proportions based upon a number two can size, placing substantially one inch of cold water in the can; three-eighths of an ounce of granulated gelatin in the can, and allowing the can and contents to stand for from two to three minutes; adding to the can, one dram of a mixture of flavor and color material, four grains of salt, three and one-half ounces of cane sugar, and fifty grains of an acid of the group consisting of tartaric and citric acids; filling the can with hot water at a minimum temperature of 212 degrees F.; immediately sealing the can; heating the sealed can and contents for substantially ten minutes in a water bath at a minimum temperature of 212 degrees F.; and then quickly cooling the sealed can and content for substantially ten minutes in a medium between freezing and room temperature.

CRAWFORD J. WALKER.

REFERENCES CITED

The following references are of record in the file of this patent:

UNITED STATES PATENTS

| Number | Name | Date |
| --- | --- | --- |
| 2,258,567 | Epstein | Oct. 7, 1941 |

FOREIGN PATENTS

| Number | Country | Date |
| --- | --- | --- |
| 374,894 | Great Britain | of 1932 |
| 419,838 | Great Britain | of 1934 |

OTHER REFERENCES

"A Complete Course in Canning," 5th ed., 1924, pp. 47 and 48.